United States Patent
Gargalaka, Jr. et al.

(10) Patent No.: US 11,292,234 B2
(45) Date of Patent: *Apr. 5, 2022

(54) POLYOLEFIN BASED FILMS SUITABLE FOR THERMOFORMING

(75) Inventors: João Gargalaka, Jr., São Paulo (BR); Felipe Martinez Barreneche, Houston, TX (US); Jorge Caminero Gomes, Sao Paulo (BR); Nicolas Cardoso Mazzola, Jundiai (BR)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,975

(22) Filed: Sep. 13, 2012

(65) Prior Publication Data

US 2014/0072787 A1    Mar. 13, 2014

(51) Int. Cl.
    *B32B 27/08*      (2006.01)
    *B32B 27/32*      (2006.01)
    (Continued)

(52) U.S. Cl.
    CPC ............ *B32B 27/08* (2013.01); *B32B 27/306* (2013.01); *B32B 27/32* (2013.01);
    (Continued)

(58) Field of Classification Search
    CPC .............................. B32B 27/08; B32B 27/306
    (Continued)

(56) References Cited

U.S. PATENT DOCUMENTS

| 3,645,992 A | 2/1972 | Elston |
| 3,914,342 A | 10/1975 | Mitchell |

(Continued)

FOREIGN PATENT DOCUMENTS

| CN | 102380997 A | | 3/2012 |
| EP | 0562493 | * | 9/1993 |

(Continued)

OTHER PUBLICATIONS

International Search Report and Written Opinion for PCT/US2013/059182, dated Nov. 6, 2013, 15 pages.

(Continued)

*Primary Examiner* — Tong Guo
(74) *Attorney, Agent, or Firm* — Cantor Colburn LLP

(57) ABSTRACT

The present invention relates to a film structure comprising an outer layer, a core and an inner layer (or sealant layer). The outer layer comprises a polyolefinic material having a Vicat softening temperature of 85° C. or greater, and a total crystallinity in the range of 25 to 45%. The core comprises a linear low density polyethylene having a density of 0.925 g/cm$^3$ or less, and a melt index of 4.0 g/10 min or less. The inner layer comprises linear low density polyethylene having a density of from 0.865 to 0.926 g/cm$^3$ and a melt index of less than 4.0 g/10 minutes. The films of the present invention have less than 25% of polyethylenes having a density of 0.930 g/cm$^3$ or greater. Further, the films of the present invention can be characterized by the substantial absence of polyamide, polyester, ethylene vinyl acetate, ionomers, polyvinyl chloride, and/or cyclic olefin polymers.

10 Claims, 2 Drawing Sheets

(51) Int. Cl.
*B32B 27/30* (2006.01)
*B29C 51/00* (2006.01)
*B29K 23/00* (2006.01)
*B29C 48/00* (2019.01)
*B29C 48/10* (2019.01)
*B29C 48/14* (2019.01)

(52) U.S. Cl.
CPC .......... *B29C 48/0018* (2019.02); *B29C 48/10* (2019.02); *B29C 48/147* (2019.02); *B29C 51/002* (2013.01); *B29C 2791/007* (2013.01); *B29K 2023/0633* (2013.01); *B29K 2023/0641* (2013.01); *B29K 2023/12* (2013.01); *B32B 2250/242* (2013.01); *B32B 2307/581* (2013.01); *B32B 2307/7244* (2013.01); *B32B 2307/738* (2013.01); *B32B 2553/00* (2013.01); *Y10T 428/24992* (2015.01)

(58) Field of Classification Search
USPC .................................................. 428/218, 215
See application file for complete search history.

(56) References Cited

U.S. PATENT DOCUMENTS

| | | | |
|---|---|---|---|
| 4,076,698 A | 2/1978 | Anderson et al. | |
| 4,252,851 A * | 2/1981 | Lansbury et al. | 428/336 |
| 4,390,587 A * | 6/1983 | Yoshimura et al. | 428/215 |
| 4,469,742 A * | 9/1984 | Oberle et al. | 428/215 |
| 4,599,392 A | 7/1986 | McKinney et al. | |
| 4,735,855 A | 4/1988 | Wofford et al. | |
| 4,950,541 A * | 8/1990 | Tabor et al. | 428/373 |
| 5,272,236 A | 12/1993 | Lai et al. | |
| 5,278,272 A | 1/1994 | Lai et al. | |
| 5,310,584 A * | 5/1994 | Jacoby et al. | 428/2 |
| 5,582,923 A | 12/1996 | Kale et al. | |
| 5,733,155 A | 3/1998 | Sagawa et al. | |
| 5,854,045 A | 12/1998 | Fang et al. | |
| 6,248,442 B1 * | 6/2001 | Kong et al. | 428/355 EN |
| 6,379,812 B1 * | 4/2002 | Hofmeister | B32B 27/28 428/34.1 |
| 6,525,157 B2 | 2/2003 | Cozewith et al. | |
| 6,861,127 B2 | 3/2005 | Glawe et al. | |
| 6,942,927 B2 | 9/2005 | Shepard et al. | |
| 6,960,635 B2 | 11/2005 | Stevens et al. | |
| 7,829,633 B2 | 11/2010 | Heukelbach et al. | |
| 2002/0187360 A1 * | 12/2002 | Uehara et al. | 428/516 |
| 2004/0077810 A1 * | 4/2004 | Marechal | 526/183 |
| 2006/0105166 A1 | 5/2006 | Lischefski et al. | |
| 2006/0275610 A1 * | 12/2006 | Swei | B32B 25/16 428/421 |
| 2008/0202075 A1 | 8/2008 | Kronawittleither et al. | |
| 2008/0226920 A1 | 9/2008 | Parkinson et al. | |
| 2008/0268272 A1 * | 10/2008 | Jourdain | B32B 25/08 428/523 |
| 2009/0061129 A1 * | 3/2009 | Fraschini et al. | 428/34.9 |
| 2009/0081439 A1 | 3/2009 | Lischefski et al. | |
| 2009/0104424 A1 * | 4/2009 | Manrique et al. | 428/220 |
| 2009/0301035 A1 | 12/2009 | Bernig et al. | |
| 2010/0269455 A1 | 10/2010 | Parkinson et al. | |
| 2011/0039098 A1 * | 2/2011 | Forloni et al. | 428/339 |
| 2011/0171407 A1 * | 7/2011 | Mazzola et al. | 428/36.9 |
| 2011/0284071 A1 * | 11/2011 | Hashimoto | B32B 27/08 136/256 |
| 2012/0232191 A1 * | 9/2012 | Auffermann et al. | 524/5 |
| 2015/0140304 A1 | 5/2015 | Manrique et al. | |

FOREIGN PATENT DOCUMENTS

| | | |
|---|---|---|
| EP | 1772487 A1 | 4/2007 |
| EP | 2329949 A1 | 6/2011 |
| EP | 2669086 A1 | 12/2013 |
| JP | 2005219485 A | 8/2005 |
| WO | 01/94111 A1 | 12/2001 |
| WO | 0226494 A2 | 4/2002 |
| WO | WO 0238383 * | 5/2002 |
| WO | 2005103123 A1 | 11/2005 |
| WO | 2007044544 A2 | 4/2007 |
| WO | WO2010087452 * | 8/2010 |
| WO | 2011/085377 A1 | 7/2011 |
| WO | 2011085379 A1 | 7/2011 |

OTHER PUBLICATIONS

Mat Web, Material Data; "Overview of materials for Linear Medium Density Polyethylene (LMDPE), Film" http://www.matweb.com/search/datasheet_print aspx?matguid= 408398293e4240a2a2ab30633163dfdc, downloaded Jun. 24, 2019.
MatWeb;Material Data; "Overview of materials for Medium Density Polyethylene (MDPE), Film Grade"; http://www.matweb.com/search/DataSheet.aspx?MatGUID= d9e80589aaf144a3a8eaad08af77f181; Downloaded Jun. 24, 2019.

* cited by examiner

POLYOLEFIN BASED FILMS SUITABLE FOR THERMOFORMING

FIELD OF THE INVENTION

The present invention relates to polyolefin-based multilayer film structures suitable for use in thermoforming applications. The films of the present invention are characterized by having relatively high elongation under thermoforming conditions, without requiring the use of polyamide, polyester, ethylene vinyl acetate, ionomers, polyvinyl chloride, and/or cyclic olefin polymers.

BACKGROUND AND SUMMARY OF THE INVENTION

Thermoforming is one of the most frequently used thermoplastic film-forming techniques in many packaging applications because of ease of production, low cost, high speed and high performance. There are basically two types of thermoformed packaging: rigid and flexible. For rigid thermoforming sheets, the main materials used are polystyrene (PS), polyester (including polyethylene terephthalate (PET)), and polypropylene (PP). For flexible thermoformed packaging, coextrusion is usually used due the complexity of the structure resulting from the presence of polyamide (PA) or polypropylene (PP) layers which are generally considered to be indispensable due to their good thermo mechanical properties that allows good thermoformability.

Quality problems related to thermoforming can be linked directly with the structural composition of the films. Polymers must be chosen which will support the thermoforming process. Frequent problems which have been reported are: high thickness variation of the thermoformed film (wall thickness distribution) (see, for example, Ayhan, Z.a.Z., H., "Wall Thickness Distribution in Thermoformed Food Containers Produced by a Benco Aseptic Packaging Machine", Polymer Engineering and Science, 2000. 40; rupture of the film after the thermoforming (see, for example, N. J. Macauley, E. M. A. H.-I., and W. R. Murphy, "The Influence of Extrusion Parameters on the Mechanical Properties of Polypropylene Sheet", *Polymer Engineering and Science,* 1998. 38; and irregularities in the surface of the thermoformed film.

The present invention relates to flexible films for thermoforming applications which are rich in polyethylene (PE) and which do not require the use of polyamides, ethylene vinyl acetate (EVA), polyesters such as polyethylene terephthalate (PET), polyvinyl chloride (PVC), cyclic olefin polymers or ionomers in the structure composition.

Accordingly, in one aspect, the present invention is a film structure comprising at least an outer layer, a core and an inner layer (or sealant layer). The outer layer comprises a polymeric material selected from the group consisting of propylene a-olefin copolymers, propylene homopolymers, MDPE, or blends thereof. The outer layer should have a Vicat softening temperature of 85° C. or greater, most preferable 90° C. or greater, and a total crystallinity in the range of 25 to 45%.

The core of the films of the present invention comprises a linear low density polyethylene having a density of 0.925 g/cm$^3$ or less, and a melt index of 4.0 g/10 min or less. The core may comprise a single layer or, more preferably multiple layers, with additional layers adding functionality such as barrier properties, melt strength or additional toughness depending on the intended application for the film.

The inner layer (or sealant layer), of the films of the present invention comprises a polymer selected from the group consisting of non-metallocene linear low density polyethylene having a density of from 0.900 to 0.926 g/cm$^3$ and a melt index of less than 4.0 g/10 min and/or metallocene linear low density having a density of from 0.865 to 0.926 g/cm$^3$ and a melt index of less than 4.0 g/10 minutes.

The films of the present invention are further characterized by having the total amount of polyethylene having a density of 0.930 g/cm$^3$ or greater which makes up the film be less than 25% by weight of the entire film. Further the films of the present invention can be characterized by the substantial absence (for example less than 5%, more preferably less than 1% by weight of the film) of polyamide, polyester, ethylene vinyl acetate, ionomers, polyvinyl chloride, and/or cyclic olefin polymers.

DETAILED DESCRIPTION OF THE INVENTION

Figure 1:
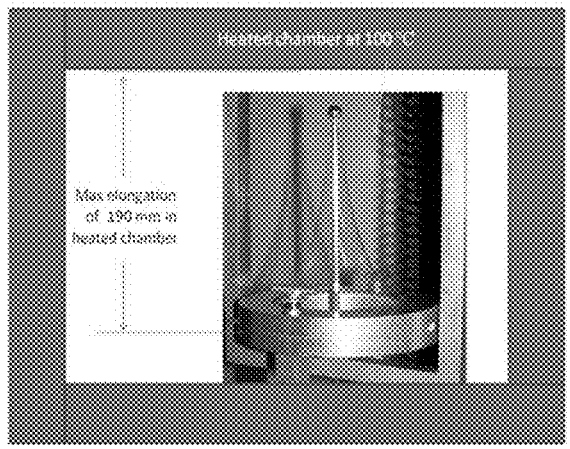
FIG. 1 depicts the testing equipment used to determine Puncture Resistance according to ASTM D5748.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); constrained geometry catalyzed (including metallocene and post metallocene catalysts) Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). The process results in a polymer architecture characterized by many long chain branches, including branching on branches. LDPE resins typically have a density in the range of 0.916 to 0.940 g/cm$^3$.

The term "linear polyethylene", is a generic term that includes both resin made using the traditional chromium or Ziegler-Natta catalyst systems as well as single-site catalysts such as metallocenes (sometimes referred to as "m-LLDPE") and includes linear, substantially linear or heterogeneous polyethylene copolymers or homopolymers. Linear polyethylenes contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The linear polyethylenes can be made via gas-phase, solution-phase or slurry polymerization or any combination thereof, using any type of reactor or reactor configuration known in the art, with gas and solution phase reactors being most preferred.

For purposes of the present invention the term linear polyethylene is subdivided into following classifications:

"LLDPE" refers to linear polyethylene having a density in the range of from about 0.855 about 0.912 g/cm$^3$ to about 0.925 g/cm$^3$). "LLDPE" may be made using chromium, Ziegler-Natta, metallocene, constrained geometry, or single site catalysts. The term "LLDPE" includes znLLDPE, uLLDPE, and mLLDPE. "znLLDPE" refers to linear polyethylene made using Ziegler-Natta or chromium catalysts and typically has a density of from about 0.912 to about 0.925 and a molecular weight distribution greater than about 2.5, "uLLDPE" or "ultra linear low density polyethylene" refers to linear polyethylene having a density of less than 0.912 g/cm$^3$), but which is made using chromium or Ziegler-Natta catalysts and thus typically have a molecular weight distribution ("MWD") greater than 2.5. "mLLDPE" refers to LLDPE made using metallocene, constrained geometry, or single site catalysts. These polymers typically have a molecular weight distribution ("MWD") in the range of from 1.5 to 8.0. These resins will typically have a density in the range of from about 0.855 to 0.925 g/cm$^3$.

"MDPE" refers to linear polyethylene having a density in the range of from greater than 0.925 g/cm$^3$ to about 0.940 g/cm$^3$). "MDPE" is typically made using chromium or Ziegler-Natta catalysts or using metallocene, constrained geometry, or single cite catalysts, and typically have a molecular weight distribution ("MWD") greater than 2.5.

"HDPE" refers to linear polyethylene having a density in the range greater than or equal to 0.940 g/cm$^3$). "HDPE" is typically made using chromium or Ziegler-Natta catalysts or using metallocene, constrained geometry, or single cite catalysts and typically have a molecular weight distribution ("MWD") greater than 2.5.

"Multimodal" means resin compositions which can be characterized by having at least two distinct peaks in a GPC chromatogram showing the molecular weight distribution. Multimodal includes resins having two peaks as well as resins having more than two peaks.

"Polypropylene" shall mean polymers comprising greater than 50% by weight of units which have been derived from propylene monomer. This includes homopolymer polypropylene, random copolymer polypropylene, and impact copolymer polypropylene. These polypropylene materials are generally known in the art. "Polypropylene" also includes the relatively newer class of polymers known as propylene based plastomers or elastomers ("PBE" of "PBPE"). These propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

The following analytical methods are used in the present invention:

Density is determined in accordance with ASTM D792.

"Melt index" is used for polyethylene resins and also referred to as "I$_2$" is determined according to ASTM D1238 (190° C., 2.16 kg). Melt Flow Rate is used for polypropylene based resins and determine according ASTM D1238 (230° C., 2.16 kg).

Peak melting point is determined by Differential Scanning calorimeter (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

Percent crystallinity by weight is calculated according to Equation 1:

$$\text{Crystallinity (wt \%)} = \Delta H \Delta Ho \times 100\%, \quad \text{(Eq. 1)}$$

where the heat of fusion (quadratureH) is divided by the heat of fusion for the perfect polymer crystal (quadratureHo) and then multiplied by 100%. For ethylene crystallinity, the heat of fusion for a perfect crystal is taken to be 290 J/g. For example, an ethylene-octene copolymer which upon melting of its polyethylene crystallinity is measured to have a heat of fusion of 29 J/g; the corresponding crystallinity is 10 wt %. For propylene crystallinity, the heat of fusion for a perfect crystal is taken to be 165 J/g. For example, a propylene-ethylene copolymer which upon melting of its propylene crystallinity is measured to have a heat of fusion of 20 J/g; the corresponding crystallinity is 12.1 wt %.

Heat of fusion is obtained using a DSC thermogram obtained by model Q1000 DSC from TA Instruments, Inc. (New Castle, Del.). Polymer samples are pressed into a thin film at an initial temperature of 190° C. (designated as the "initial temperature"). About 5 to 8 mg of sample is weighed out and placed in the DSC pan. The lid is crimped on the pan to ensure a closed atmosphere. The DSC pan is placed in the DSC cell and then heated at a rate of about 100° C./minute to a temperature (To) of about 60° C. above the melt temperature of the sample. The sample is kept at this temperature for about 3 minutes. Then the sample is cooled at a rate of 10° C./minute to −40° C., and kept isothermally at that temperature for 3 minutes. The sample is then heated at a rate of 10° C./minute until complete melting. Enthalpy curves resulting from this experiment are analyzed for peak melt temperature, onset and peak crystallization temperatures, heat of fusion and heat of crystallization, and any other DSC analyses of interest.

The term molecular weight distribution or "MWD" is defined as the ratio of weight average molecular weight to number average molecular weight ($M_w/M_n$). $M_w$ and $M_n$ are determined according to methods known in the art using conventional gel permeation chromatography (GPC).

"Elongation" or "Puncture Resistance" is determined according to ASTM D5748, at a chamber temperature of 100° C. FIG. 1 shows a picture of puncture test set up.

FIG. 1—Puncture Test Set Up

Film Structure

The films of the present invention comprise at least 3 layers: an outer layer, a core layer and a sealant or inner layer. The outer layer comprises a polymeric material selected from the group consisting of propylene based plastomers or elastomers, propylene homopolymers, MDPE, HDPE or blends thereof. The outer layer should have a Vicat softening temperature of 90° C. or greater, and a total crystallinity in the range of 25 to 45%. It is preferred that the resin composition used for the outer layer have a melt index of less than 4 g/10 minutes, preferably between 2 and 4 g/10 min for cast films and less than 2 g/10 min for blow film extrusion processes. The ethylene propylene copolymer or the MDPE can be used preferably in the outer layer because this layer will be in contact with the thermoforming mold and if the material is too soft, the film can adhere to the mold. The use of the propylene based plastomers and elastomers on an amount of from 1 to 100% by weight of the outer layer, is preferred, as it has been found that such materials have enhanced thermal resistance and helps to prevent the film from sticking in the thermoforming mold. Such materials are advantageously produced using metallocene, constrained geometry, or single cite catalysts, and includes VERSIFY™ polymers. These materials are preferred due to lower crystallinity level of these materials compared to standard Ziegler-Natta polypropylene resins. The preferred subclass of these material are copolymers of propylene with from 0 to 5% by weight of comonomer, with the preferred comonomer being α-olefins such as ethylene, butene, hexene, octene or decadiene. It is believed that the use of MDPE or HDPE in the outer layer will aid in providing film structured with higher stiffness, however, the overall structure of the film should be chosen such that the total amount of HDPE and MDPE (combined) is no more than about 25% by weight of the film structure, in order to maintain good thermoformability. It should be understood that minor amounts of other polymers may also be used in the outer layer The core of the films of the present invention comprises LLDPE having a density less than 0.925 g/cm³, preferably less than 0.912 g/cm³, and having a melt index of 4.0 g/10 min or less. The LLDPE may be blended with other materials such as LDPE, but the total amount of LDPE should not exceed 50% by weight of the core structure. It is preferred that at least one layer in the core comprise from 50% to 100% by weight of uLLDPE or mLLDPE.

The core may comprise a single layer or, more preferably, multiple layers, with additional layers adding functionality such as barrier properties, melt strength or additional toughness depending on the intended application for the film. For example a layer comprising EVOH may be added to impart barrier resistance to the film, and tie layers such as maleic anhydride grafted polyethylene may then be used between the EVOH layer and the adjacent layers to help ensure structural integrity of the film.

The inner layer (or sealant layer), of the films of the present invention comprises a polymer selected from the group consisting of LLDPE and mLLDPE. The resin should have a melt index of less than 4.0 g/10 minutes. Additional materials may be blended with the LLDPE and/or mLLDPE. For example, if bubble stability is required during the extrusion process, LDPE can be added (to increase melt strength) in a maximum of 30% in the layer composition.

In addition to using LDPE to increase the melt strength, it has been also been discovered that the LLDPE or mLLDPE can be reacted to a free radical generator such as peroxide, azide or with an alkoxy amine derivative in an amount less than 900 parts derivative per million parts of total polyethylene resin with the polyethylene resin under conditions sufficient to increase the melt strength of the polyethylene resin. This process is more completely described in us2011/0171407 or WO2011/085377, herein incorporated by reference in their entirety. A particularly preferred species of alkoxy amine derivative is 9-(acetyloxy)-3,8,10-triethyl-7,8,10-trimethyl-1,5-dioxa-9-azaspiro[5.5]undec-3-yl]methyl octadecanoate which has the following chemical structure:

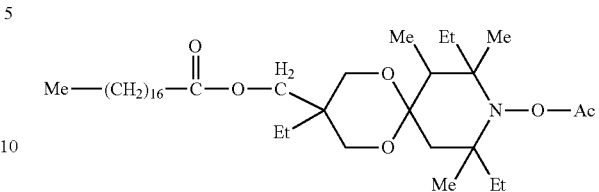

Preferably, at least a portion (more preferably from 1 to 90%) of the LLDPE used in the inner layer has been reacted with a free radical generator.

Using linear polyethylene with increased melt strength or blending small amounts of LDPE, (that is, less than 50%, preferably less than 40%, more preferably less than 25%), may also be advantageous for the core layer or layers of the film structure, improving thermoformability and process stability during blow film extrusion.

The films of the present invention are further characterized by having the total amount of polyethylene having a density of 0.930 g/cm³ or greater which makes up the film be less than 25% by weight of the entire film. Further the films of the present invention can be characterized by the substantial absence (for example than 5%, more preferably less than 1% by weight of the film) of polyamide, polyester, ethylene vinyl acetate, ionomers, polyvinyl chloride, and/or cyclic olefin polymers.

The films of the present invention preferably have a total thickness, before thermoforming, in the range of from 30 μm to 250 μm, preferably 100 μm to 200 μm, more preferably about 150 μm. Individual layer thickness might vary depending on the number of layers available and the total thickness of the film. The preferred outer layer thickness varies from 5 to 50 μm, if added, the core-barrier layer thickness can vary from 2 to 10 μm, the core tie layers can vary from 2 to 10 μm, the sealant layer thickness can vary from 5 to 35 μm. All core layers combined can vary in thickness from 25 to 200 μm. These films are coextruded and have at least 3 layers, preferably have 3 to 14 layers, more preferably 5 to 9, still more preferably about 7 layers.

The films of the present invention should be well-suited for use in thermoforming applications. It has been found that one way to predict the applicability of the films in such applications is to subject the film to the "Puncture Resistance" test determined according to ASTM D5748, at a chamber temperature of 100° C. The films elongation should achieve a penetration of the probe to at least about 150 mm, preferably at least 190 mm.

Examples

A series of films were produced using 11 different materials (Table 1). Resin 1 is a LLDPE produced by Ziegler-Natta catalyst, Resin 2 and 11 are a LDPE, Resin 3 is a ULLDPE produced by a Ziegler-Natta catalyst, Resin 4 is a HDPE, Resin 5 is a Propylene based plastomer or elastomer (PBPE) produced by a Metallocene catalyst, Resins 6 and 7 are MDPE, Resin 8 is a LLDPE produced by a Metallocene catalyst, Resin 9 is the Maleic anhydride grafted polymer (MAH) polyolefin based and Resin 10 are the EVOH (Ethylene content=38%).

TABLE 1

Materials used in this study

| Name | Melt Index (190° C. 2.16 kg) (g/10 min) | Density (g/cm3) |
|---|---|---|
| Resin 1 | 0.75 | 0.918 |
| Resin 2 | 0.30 | 0.922 |
| Resin 3 | 0.50 | 0.905 |
| Resin 4 | 0.95 | 0.950 |
| Resin 5 | 2.00* | 0.888 |
| Resin 6 | 0.50 | 0.935 |
| Resin 7 | 0.20 | 0.937 |
| Resin 8 | 1.00 | 0.904 |
| Resin 9 | 2.00 | 0.958 |
| Resin 10 | 1.70 | 1.170 |
| Resin 11 | 2.00 | 0.922 |

*Melt Flow Rate at 230° C. and 2.16 kg

The LLDPE produced by Metallocene catalyst, ULLDPE and the PBPE were used in the structures composition to enhance toughness and elongation, which is an important property in thermoforming applications.

The structures made for this study are presented in Table 2 and all the samples have thicknesses of 150 μm.

TABLE 2

Film Structures

| Name | A | B | C | D | E | F | G |
|---|---|---|---|---|---|---|---|
| Inventive Example 1 | Resin 1 (80%) Resin 2 (20%) 20% | Resin 1 (80%) Resin 2 (20%) 10% | Resin 3 (100%) 10% | Resin 3 (100%) 10% | Resin 1 (70%) Resin 4 (30%) 15% | Resin 1 (70%) Resin 4 (30%) 15% | Resin 1 (70%) Resin 4 (30%) 20% |
| Inventive Example 2 | Resin 1 (80%) Resin 2 (20%) 20% | Resin 1 (80%) Resin 2 (20%) 10% | Resin 3 (100%) 10% | Resin 3 (100%) 10% | Resin 5 (100%) 15% | Resin 5 (100%) 15% | Resin 6 (100%) 20% |
| Inventive Example 3 | Resin 8 (100%) 20% | Resin 8 (100%) 10% | Resin 3 (100%) 10% | Resin 3 (100%) 10% | Resin 1 (80%) Resin 2 (20%) 20% | Resin 1 (80%) Resin 2 (20%) 20% | Resin 5 (100%) 20% |
| Inventive Example 4 | Resin 1 (80%) Resin 2 (20%) 20% | Resin 3 (100%) 16% | Resin 1 (80%) Resin 9 (20%) 8% | Resin 10 (100%) 8% | Resin 1 (80%) Resin 9 (20%) 8% | Resin 1 (70%) Resin 4 (30%) 20% | Resin 1 (70%) Resin 4 (30%) 20% |
| Inventive Example 5 | Resin 1 (80%) Resin 2 (20%) 20% | Resin 3 (100%) 16% | Resin 1 (80%) Resin 9 (20%) 8% | Resin 10 (100%) 8% | Resin 1 (80%) Resin 9 (20%) 8% | Resin 5 (100%) 20% | Resin 6 (100%) 20% |
| Comparative Example 1 | Resin 1 (80%) Resin 2 (20%) 20% | Resin 1 (80%) Resin 2 (20%) 20% | Resin 3 (100%) 10% | Resin 3 (100%) 10% | Resin 1 (70%) Resin 4 (30%) 15% | Resin 1 (70%) Resin 4 (30%) 15% | Resin 6 (100%) 20% |
| Comparative Example 2 | Resin 1 (80%) Resin 2 (20%) 20% | Resin 1 (80%) Resin 2 (20%) 20% | Resin 3 (100%) 10% | Resin 7 (100%) 10% | Resin 1 (70%) Resin 4 (30%) 15% | Resin 1 (70%) Resin 4 (30%) 15% | Resin 6 (100%) 20% |
| Comparative Example 3 | Resin 1 (80%) Resin 2 (20%) 20% | Resin 3 (100%) 16% | Resin 1 (80%) Resin 9 (20%) 8% | Resin 10 (100%) 8% | Resin 1 (80%) Resin 9 (20%) 8% | Resin 1 (70%) Resin 4 (30%) 20% | Resin 6 (100%) 20% |
| Comparative Example 4 | Resin 2 (100%) 15% | Resin 2 (100%) 15% | Resin 2 (100%) 15% | Resin 2 (100%) 10% | Resin 2 (100%) 15% | Resin 2 (100%) 15% | Resin 2 (100%) 15% |
| Comparative Example 5 | Resin 11 (100%) 15% | Resin 11 (100%) 15% | Resin 11 (100%) 15% | Resin 11 (100%) 10% | Resin 11 (100%) 15% | Resin 11 (100%) 15% | Resin 11 (100%) 15% |
| Comparative Example 6 | Resin 4 (100%) 15% | Resin 4 (100%) 15% | Resin 4 (100%) 15% | Resin 4 (100%) 10% | Resin 4 (100%) 15% | Resin 4 (100%) 15% | Resin 4 (100%) 15% |

1. Film Properties

To analyze and compare all these structures, a method that simulates the thermoforming conditions is used. This test method determines the resistance of a film to the penetration of a probe at a standard low rate, a single test velocity (ASTM D5748). The only difference from the original test is that it was not perform at standard conditions, it was used a hot chamber to heat the sample at 100° C. and the penetration rate was 1000 mm/min, in order to simulate thermoforming conditions. The test method imparts a biaxial stress that is representative of the type of stress encountered in many product end-use applications, including thermoforming. The maximum force, force at break, penetration distance (Elongation, measured in "mm"), and energy to break are determined. Due to the size of the hot chamber used, the maximum elongation permitted is 190 mm If, at this elongation, the sample didn't break, then the test is stopped and "≥190" is recorded.

Figure 2:
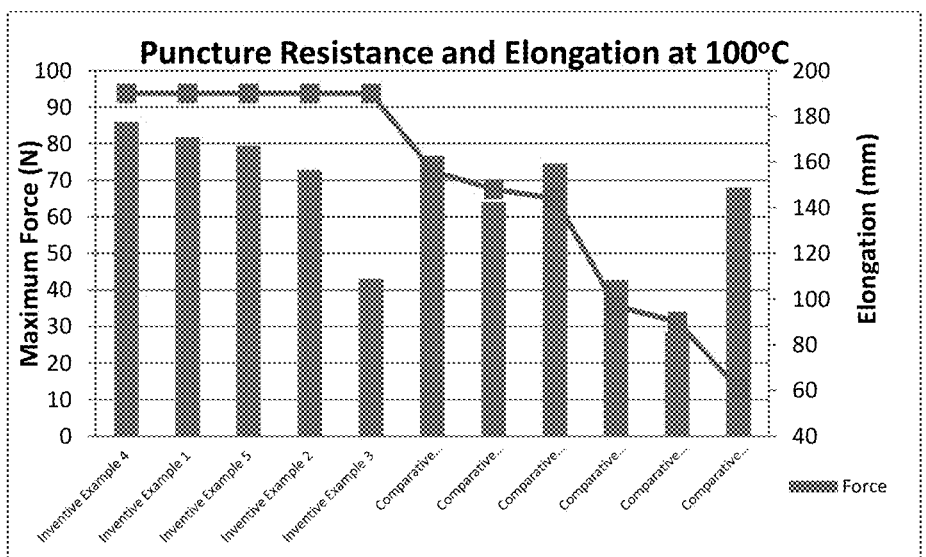
FIG. 2 is a graph showing Puncture Resistance and Elongation at 100° C. for the examples.

This test can show which sample can reach the maximum elongation under high temperature without breaking, and this is what is expected from a thermoforming film. In Table 3 it is shown the maximum force and elongation achieved by all the samples and in FIG. 2 it is the graphic representation of the test results, showing the maximum force achieved and the elongation. Maximum force should be lower than 90N and preferably less than 50N.

TABLE 3

Puncture test under 100° C.

| Sample | Maximum Force (N) | Elongation (mm) |
|---|---|---|
| Inventive Example 4 | 86 | ≥190 |
| Inventive Example 1 | 82 | ≥190 |
| Inventive Example 5 | 79 | ≥190 |
| Inventive Example 2 | 73 | ≥190 |
| Inventive Example 3 | 43 | ≥190 |
| Comparative Example 3 | 77 | 156 |
| Comparative Example 1 | 64 | 148 |
| Comparative Example 2 | 75 | 144 |
| Comparative Example 4 | 43 | 97 |
| Comparative Example 5 | 29 | 90 |
| Comparative Example 6 | 68 | 61 |

In FIG. 1 it is possible to see that all the 5 inventive examples reach the maximum elongation without breaking. All the comparative examples broke under these conditions. Comparative examples 1, 2 and 3 have the higher amount of HDPE and MDPE, more than 25% in the structure composition. When the amount of those two materials increases, the stiffness increases too, and the elongation decreases. And to prove this statement, the comparative example 6 is a film composed by 100% HDPE, which gives the worst elongation result.

LDPE has a high branched molecular structure given high values of melt strength. Some studies have also shown the relationship between melt strength and thermoforming for polypropylene. But for polyethylene this relationship is not the same. The comparative examples 4 and 5 are films having 100% LDPE with different melt index values and both of than broke in the puncture test, showing that the polyethylene films for thermoforming depends mainly on the LLDPE content due to its high elongation properties. LDPE can be used as a minor blend component to help on the processability, however.

The inventive example 3 was the one that had the best performance in the puncture test and in the thermoforming trials. This example achieved the maximum elongation but with the lowest force.

Inventive examples 1, 2 and 3 and comparative examples 1 and 2 (all this examples are polyethylene based films) are submitted to a thermoforming test (thermoforming temperature: 95° C./Vacuum time: 2 seconds). Both comparative examples broke in the thermoformed corners whereas the inventive examples didn't break, showing that the puncture resistance test is relevant and helps to distinguish different structures for predicting thermoforming performance.

Figure 3:
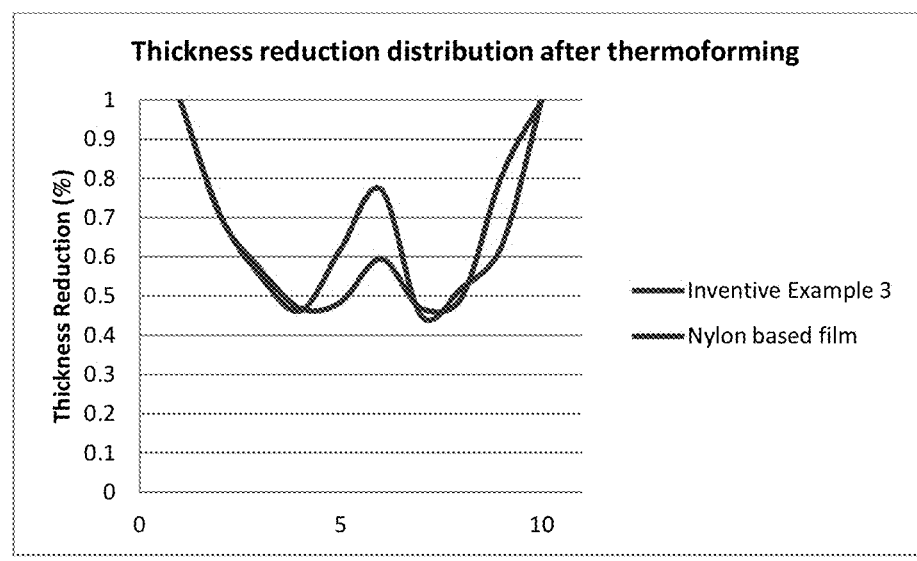
FIG. 3 is a graph showing thickness reduction distribution of an inventive Example versus a nylon comparative example.

The inventive example 3 was submitted to a thermoforming process and compared with a nylon based structure. After the thermoforming tests it was possible to compare the thickness variation of the thermoformed packages (Inventive and Nylon) and the thickness reduction (measured in the cross direction) is shown in FIG. 3. The reduction at the edges is basically the same (50%) and the thickness in the thermoformed corners were reduced in 74% for both samples, showing that the performance of this type of polyethylene film when compared to nylon based film are at the same level.

What is claimed is:

1. A film structure suitable for use in thermoforming applications, comprising:
   a. an outer layer, where the outer layer comprises a combination of high density polyethylene and linear low density polyethylene, where the outer layer has a Vicat softening temperature of 90° C. or greater, a total crystallinity in the range of 25 to 45%, and where the outer layer has a melt index of less than 2.0 g/10 min;
   b. a core, where the core layer comprises a linear low density polyethylene having a density of 0.925 g/cm$^3$ or less, and a melt index of 4.0 g/10 min or less; where the core comprises at least one layer that comprises ultra low density polyethylene or mLLDPE, and where the core layer has an overall density of less than 0.912 g/cm$^3$; and
   c. an inner layer, where the inner layer comprises a linear low density polyethylene having a density of from 0.865 to 0.925 g/cm$^3$ and a melt index of less than 4.0 g/10 min, and up to 30% by weight of the inner layer of high pressure low density polyethylene; wherein the total amount of polyethylene having a density of 0.930 g/cm$^3$ or greater is less than 25% by weight of the entire film, and wherein the film structure is characterized by comprising less than 5% by weight of the film of polyamide, polyester, ethylene vinyl acetate, ionomers, polyvinyl chloride, and/or cyclic olefin polymers; wherein
   the linear low density polyethylene or mLLDPE further reacted to a free radical generator peroxide, an azide or with an alkoxy amine derivative in an amount less than 900 parts derivative per million parts of total polyethylene resin with the polyethylene resin under conditions sufficient to increase the melt strength of the polyethylene resin.

2. The film structure of claim 1 wherein the film is characterized by having a penetration of probe according to ASTM D5748 at 100° C. of at least 190 mm.

3. The film structure of claim 1 wherein the film structure contains from 3 to 14 distinct layers.

4. The film structure of claim 1 wherein the film structure contains from 5 to 9 distinct layers.

5. The film structure of claim 1 wherein the core comprises from 1 to 12 distinct layers: wherein the linear low density polyethylene or mLLDPE further reacted to a free radical generator such as peroxide, an azide or with an alkoxy amine derivative in an amount less than 900 parts derivative per million parts of total polyethylene resin with the polyethylene resin under conditions sufficient to increase the melt strength of the polyethylene resin.

6. The film structure of claim 3 wherein the film structure further comprises a barrier layer, said barrier layer comprising EVOH.

7. The film structure of claim 6 further comprising tie layers on either side of the barrier layer, said tie layers comprising maleic anhydride grafted polyethylene.

8. The film structure of claim 1 wherein the linear low density polyethylene used in the inner layer has a lower density than the linear low density polyethylene used in the core layer.

9. The film structure of claim 1 wherein the film characterized by comprising less than 5% by weight of the film of polyamide, polyester, ethylene vinyl acetate, ionomers, polyvinyl chloride, and/or cyclic olefin polymers and wherein the film is characterized by having a penetration of probe according to ASTM D5748 at 100° C. of at least 190 mm.

10. The film of claim 9 wherein the film has a total thickness of less than 250 μm.

* * * * *